United States Patent [19]

Thompson

[11] 4,023,831
[45] May 17, 1977

[54] PLASTIC PIPE FITTING

[75] Inventor: Dexter Mac Arthur Thompson, Elkton, Md.

[73] Assignee: E. I. Du Pont de Nemours and Company, Wilmington, Del.

[22] Filed: Nov. 26, 1974

[21] Appl. No.: 527,352

[52] U.S. Cl. .................... 285/31; 285/302; 285/423; 285/DIG. 16
[51] Int. Cl.² ........................................ F16L 21/02
[58] Field of Search ............... 285/21, 31, 32, 423, 285/DIG. 16, 302

[56] References Cited

UNITED STATES PATENTS

| | | | |
|---|---|---|---|
| 3,807,777 | 4/1974 | Larkin | 285/302 |
| 3,826,521 | 7/1974 | Wilhelmsen | 285/DIG. 16 |
| 3,857,588 | 12/1974 | Curtin | 285/DIG. 16 |

FOREIGN PATENTS OR APPLICATIONS

| | | | |
|---|---|---|---|
| 1,559,983 | 2/1969 | France | 285/302 |
| 981,498 | 1/1965 | United Kingdom | 285/302 |
| 867,989 | 5/1961 | United Kingdom | 285/302 |

*Primary Examiner*—Dave W. Arola

[57] ABSTRACT

A pipe fitting of polyethylene is provided wherein the pipe fitting is of integral construction and includes (1) a tubular body member that is fusion bonded at each end to (2) a coupling member, and (3) a movable tubular member that engages one coupling member for axial movement in relation thereto, i.e., telescoping action. The pipe fitting is useful for repairing a damaged pipe in that the one coupling member thereof may be bonded to one exposed end of the damaged pipe while the telescoped tubular member may be moved into engagement with and bonded to the other exposed end of the damaged pipe.

2 Claims, 2 Drawing Figures

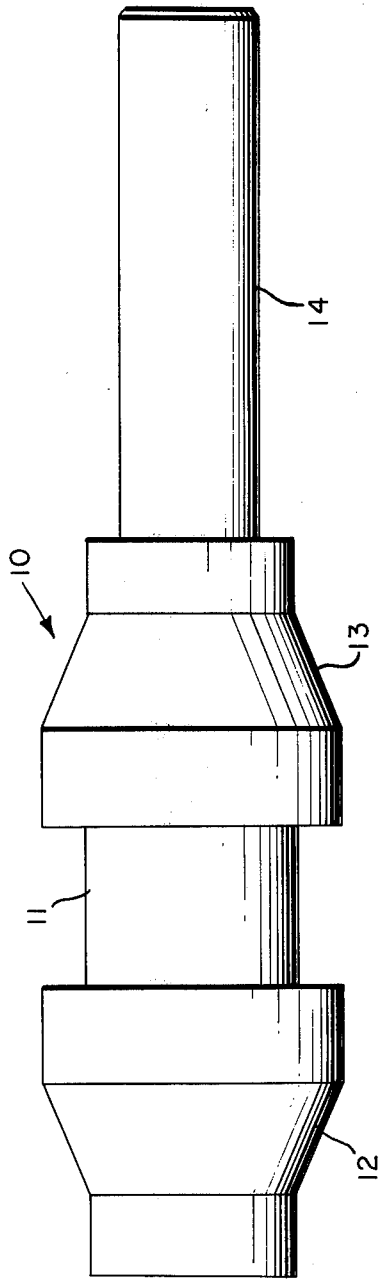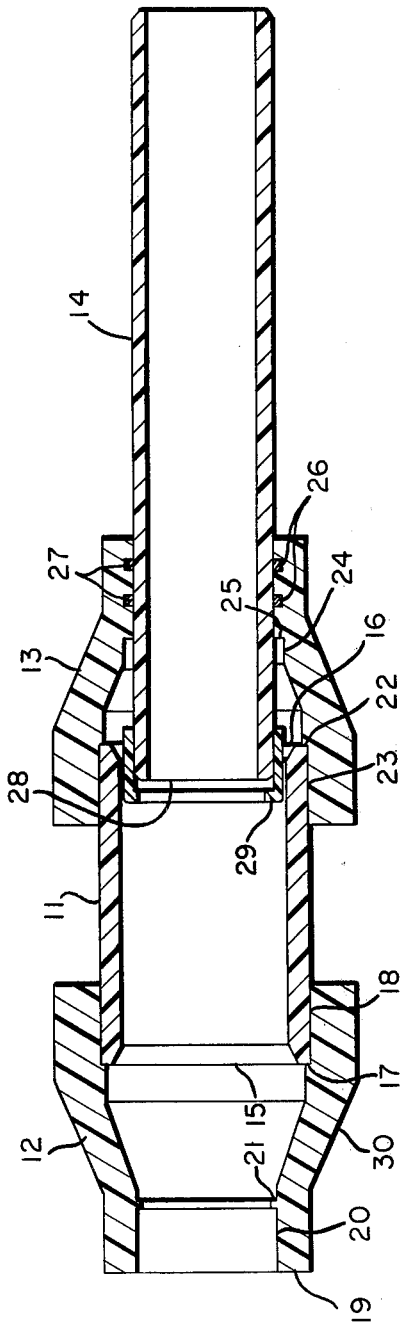

PLASTIC PIPE FITTING

FIELD OF THE INVENTION

The present invention relates to articles of manufacture of organic polymeric material and, more particularly, is directed to a pipe fitting of polyethylene thermoplastic material.

BACKGROUND OF THE INVENTION

Shaped structures including pipe and pipe fittings of organic polymeric material such as polyethylene have become widely known and used for diverse purposes such as for conveying fluids. Piping systems of polyethylene material have been found to be desirable especially in view of the ease with which such systems may be fabricated. For example, pipe fittings and pipe may be easily assembled together by utilizing chemical solvents, adhesives or heating treatments for joining these pieces, e.g., polyethylene pipe fittings may be joined to polyethylene pipe by heating the fitting and the pipe before assembly to melt the polyethylene at the region or surface of each piece to be contacted followed by mating the heated surfaces of each piece and cooling the heated pieces whereby to effect fusing of the polyethylene to provide a structure of unitary construction.

A serious problem encountered in the use of polyethylene piping systems is that resulting from the accidental rupture by excavating equipment of polyethylene pipe that is buried underground. The repair of ruptured polyethylene pipe necessitates the removal of the damaged pipe section and replacement thereof with a new section that is fused to the ends of the original pipe. The difficulty of effecting such repair resides in the fact that the fusion process for joining the replacement pipe to the original pipe requires the use of a coupling at each end of the original pipe and the use of a replacement pipe therebetween. It is not possible or feasible to effect such repair with short replacement pipe because of the lack of horizontal movement of the pipe sections required to obtain the necessary physical engagement of all of the parts to provide satisfactory fusion joining thereof. For example, it is necessary to excavate a trench for a distance of about 15 feet in each direction of a rupture of a polyethylene pipe having a diameter of 2 inches in order to utilize a replacement pipe having sufficient flexibility and slack to permit satisfactory joining of all of the parts for fusion welding. Accordingly, the principal object of the present invention is to provide a pipe fitting which can be readily joined to a conduit of polyethylene material.

THE INVENTION

According to the present invention there is provided a pipe fitting of organic thermoplastic polymeric material for joining two spaced pipe ends of the same or different material comprising a tubular body member; a first coupling member integrally bonded to one end of said tubular body member and adapted to be integrally bonded to one of said spaced pipe ends; a second coupling member integrally bonded to the other end of said tubular body member and having sealing means and stop means disposed therewithin; and a movable tubular member in slidable contact with said second coupling member for axial movement within said second coupling member and said tubular body member, said movable tubular member having an annular flange secured to the end thereof disposed within said second coupling member and said tubular body member for engaging said stop means for limiting the extent of axial movement of said movable tubular member in relation to said second coupling member, whereby said movable tubular member is adapted to be moved adjacent to and bonded to the other of said spaced pipe ends. In a preferred embodiment, the pipe fitting of the invention is of polyethylene.

The term "polyethylene" or "ethylene polymer" used herein means ethylene homopolymers and copolymers of ethylene with $\alpha$-olefins encompassed by the Type II and Type III classification of ASTM-D-1248-70.

DETAILED DESCRIPTION

The nature and advantages of the pipe fitting of the present invention will be more readily understood by the following description and the several views illustrated in the accompanying drawings wherein like reference characters refer to the same parts throughout the several views and in which:

FIG. 1 is an elevation view of the pipe fitting of the invention; and

FIG. 2 is a cross-sectional view along the longitudinal axis of the pipe fitting of FIG. 1.

The pipe fitting 10 herein disclosed in illustration of the invention, as depicted in FIG. 1, includes a tubular body member 11 having a coupling member 12 integrally bonded to one end thereof, a coupling member 13 integrally bonded to the other end thereof, and a tubular member 14 extending axially outwardly from coupling member 13.

The pipe fitting 10 of the invention is shown more specifically in FIG. 2 wherein the tubular body member 11 is depicted as having two ends 15 and 16. End 15 of tubular body member 11 contacts annular shoulder 17 of socket 18 of coupling member 12. The portions of tubular body member 11 and coupling member 12 that are in engagement are fusion bonded together to provide, in effect, a unitized construction. The other end 19 of coupling member 12 is provided with a socket 20 having an annular flange 21 that is adapted to receive the dressed end of a pipe member (not shown) of, for example, organic thermoplastic polymeric material, e.g., polyethylene which may be fusion bonded to coupling member 12.

The other end 16 of tubular body member 11 contacts annular shoulder 22 of socket 23 of coupling member 13, and the portions of tubular member 11 and coupling member 13 that are in engagement are fusion bonded together to provide, in effect, a unitized construction. The salient feature of coupling member 13 is the provision internally thereof of a counterbore 24 that terminates in a shoulder 25 and, preferably, two or more annular grooves 26 adapted to accomodate sealing elements 27 such as conventional O-ring type seals which may be of any suitable material, e.g., Neoprene. The foregoing structural features of coupling member 13 will be more readily apparent from the description of the remainder of the pipe fitting presented next herebelow.

The remainder of pipe fitting 10 includes tubular member 14 which extends into and engages coupling member 13 to make sliding contact therewith. The end 28 of tubular member 14 that is disposed within coupling member 13 is provided with a ring member 29 of, for example, polyethylene, that is secured as by fusion bonding to the outer surface of tubular member 14.

Ring member 29 is adapted to engage counterbore 24 and contact shoulder 25 and thereby limit the extent of axial movement of tubular member 14 outwardly from coupling member 13. As can be seen from FIG. 2, tubular member 14 may be telescoped into coupling member 13 and tubular member 11.

The pipe fitting 10 of the invention is useful for effecting prompt and efficient repair of a ruptured conduit by first dressing the exposed ends of the ruptured conduit and thereafter bonding (e.g., fusion bonding) coupling member 12 to one of the two spaced ends of the ruptured conduit. The tubular member 14 that is telescoped within the body of the pipe fitting is moved outwardly from coupling member 13 and the leading end thereof is engaged into the socket of a customary coupling member that is secured to the exposed end of the ruptured conduit, and the entire assembly is bonded (e.g., fusion bonded) together. The sealing elements 27 function to prevent any leak or escape of fluid from the pipe fitting when flow of fluid is reinstituted through the piping system.

A unique and desirable aspect of the fitting of the present invention is that it may be conveniently and quickly fabricated from standard plastic fittings and pipe. For instance, when impairing a ruptured plastic pipe of Aldyl A polyethylene having a nominal 2 inch outside diameter, the tubular body member 11 of pipe fitting 10 may be a suitable length, e.g., 6 inches of standard Aldyl A polyethylene pipe having a nominal 3 inch outside diameter. Also, coupling member 12 may be a standard 2 inch by 3 inch (2 × 3) Aldyl A polyethylene reducer-coupler fitting wherein the socket elements 18 and 20 thereof are joined by a tapered body member 30. Coupling member 13 is substantially similar to coupling member 12; the external surface of coupling member 13 is identical to that of coupling member 12 but the internal structure of coupling member 13 differs by providing counterbore 24 and annular grooves 26 therein. The counterbore 24 and annular grooves 26 of coupling member 13 are provided by a standard milling operation performed on a standard 2 × 3 Aldyl A polyethylene reducer-coupler fitting. Also, the movable tubular member 14 of pipe fitting 10 may be a suitable length, e.g., 13 inches of standard Aldyl A polyethylene pipe having a nominal 2 inch outside diameter. Tubular member 14 may also be of other material such as, for example, metal and thus adapted to be bonded at its leading end, as by welding, to a metal conduit. In this latter instance, pipe fitting 10 functions as a transition fitting for coupling pipe of different materials. To illustrate further, coupling member 12 of pipe fitting 10 may be bonded to a polyethylene pipe while tubular member 14 of, for example, polyvinyl chloride, may be bonded to a polyvinyl chloride pipe.

What is claimed is:

1. A pipe fitting of organic thermoplastic polymeric material for joining two spaced pipe ends comprising
    a tubular body member;
    a first coupling member integrally bonded to one end of said tubular body member and adapted to be integrally bonded to one of said spaced pipe ends;
    a second coupling member integrally bonded to the other end of said tubular body member and having sealing means and stop means carried thereby and disposed therewithin; and
    a movable tubular member in slidable contact with said second coupling member and said sealing means for axial movement within said second coupling member and said tubular body member, said movable tubular member having an annular flange secured to the end thereof disposed within said second coupling member and said tubular body member for engaging said stop means for limiting the extent of axial movement of said movable tubular member in relation to said second coupling member,
whereby said movable tubular member is adapted to be moved adjacent to and bonded to the other of said spaced pipe ends.

2. The pipe fitting of claim 1 wherein the organic thermoplastic polymeric material thereof is polyethylene.

* * * * *